United States Patent [19]
Sangregory et al.

[11] Patent Number: 5,970,256
[45] Date of Patent: Oct. 19, 1999

[54] ONE-TIME-USE CAMERA WITH TRANSPARENT LENS RETAINER-COVER

[75] Inventors: Jude A. Sangregory, Spencerport; Joseph C. Weiser; Frederick B. Messbauer, both of Rochester, all of N.Y.

[73] Assignee: Eastman Kodak Company, Rochester, N.Y.

[21] Appl. No.: 09/034,092

[22] Filed: Mar. 3, 1998

[51] Int. Cl.⁶ ............................ G03B 17/02; G03B 17/00
[52] U.S. Cl. .............................. 396/6; 396/529; 396/530; 396/531
[58] Field of Search ................ 396/6, 529, 530, 396/531, 533

[56] References Cited

U.S. PATENT DOCUMENTS

| | | | |
|---|---|---|---|
| 5,576,782 | 11/1996 | Kameyama | 396/6 |
| 5,608,486 | 3/1997 | Takagi et al. | 396/6 |
| 5,642,235 | 6/1997 | Ichikawa | 396/529 |
| 5,721,963 | 2/1998 | Iwagaki et al. | 396/6 |
| 5,768,649 | 6/1998 | Pearson | 396/529 |
| 5,815,757 | 9/1998 | Katsura et al. | 396/529 |

FOREIGN PATENT DOCUMENTS 6-43591  2/1994  Japan.

*Primary Examiner*—Eddie C. Lee
*Attorney, Agent, or Firm*—Roger A. Fields

[57] ABSTRACT

A camera comprising a taking lens, a lens support for supporting the taking lens, and a transparent lens cover for shielding the taking lens, is characterized in that the transparent lens cover has a plurality of retaining portions that constitute a single piece with the transparent lens cover and are individually connected to the lens support to hold the taking lens to the lens support, but which can be individually disconnected from the lens support to free the taking lens.

1 Claim, 4 Drawing Sheets

ONE-TIME-USE CAMERA WITH TRANSPARENT LENS RETAINER-COVER

FIELD OF THE INVENTION

The invention relates generally to the field of photography, and in particular to one-time-use cameras. More specifically, the invention relates to a transparent retainer-cover for the taking lens in a one-time-use camera.

BACKGROUND OF THE INVENTION

Film and cameras that are all in one, commonly referred to as single-use or one-time-use cameras, have become well known. The one-time-use camera is a simple point-and-shoot type comprising a plastic main body part which supports a conventional film cartridge in a cartridge receiving chamber, an unexposed film roll in a film supply chamber, a fixed-focus taking lens, a film metering mechanism with a rotatably supported metering sprocket that engages the filmstrip, a manually rotatable thumbwheel rotatably engaged with a film spool inside the film cartridge, a single-blade shutter, a manually depressible shutter release button, a rotatable frame counter for indicating the number of exposures remaining for picture-taking, a direct see-through viewfinder, and in some models an electronic flash. A pair of opaque plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

Often, the taking lens in the one-time-use camera is not reused to remanufacture the camera because it may become scratched. Of course, a transparent lens cover can be included in the one-time-use camera to prevent the taking lens from being scratched. Prior art Japanese Patent Publication No. 6-43591 published Feb. 18, 1994 discloses a one-time-use camera having a transparent lens cover secured to the opaque front cover part of the camera. A lens support beneath the front cover part supports the taking lens. The opaque front cover part is adapted to hold the taking lens to the lens support.

SUMMARY OF THE INVENTION

A camera comprising a taking lens, a lens support for supporting the taking lens, and a transparent lens cover for shielding the taking lens, is characterized in that:

The transparent lens cover has a plurality of retaining portions that constitute a single piece with the transparent lens cover and are individually connected to the lens support to hold the taking lens to the lens support, but which can be individually disconnected from the lens support to free the taking lens.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
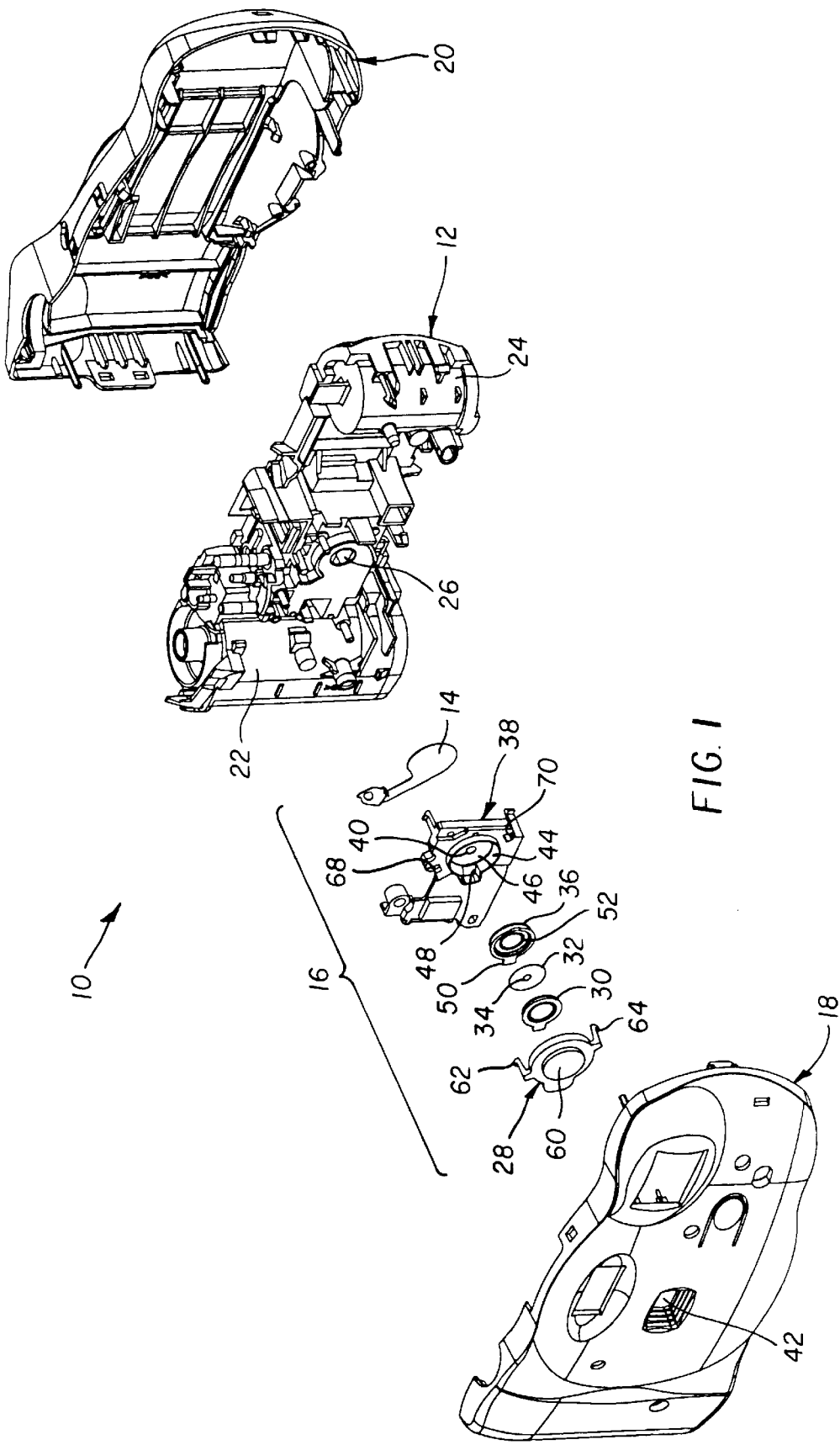
FIG. 1 is an exploded front perspective view of a one-time-use camera according to a preferred embodiment of the invention.
Figure 2:
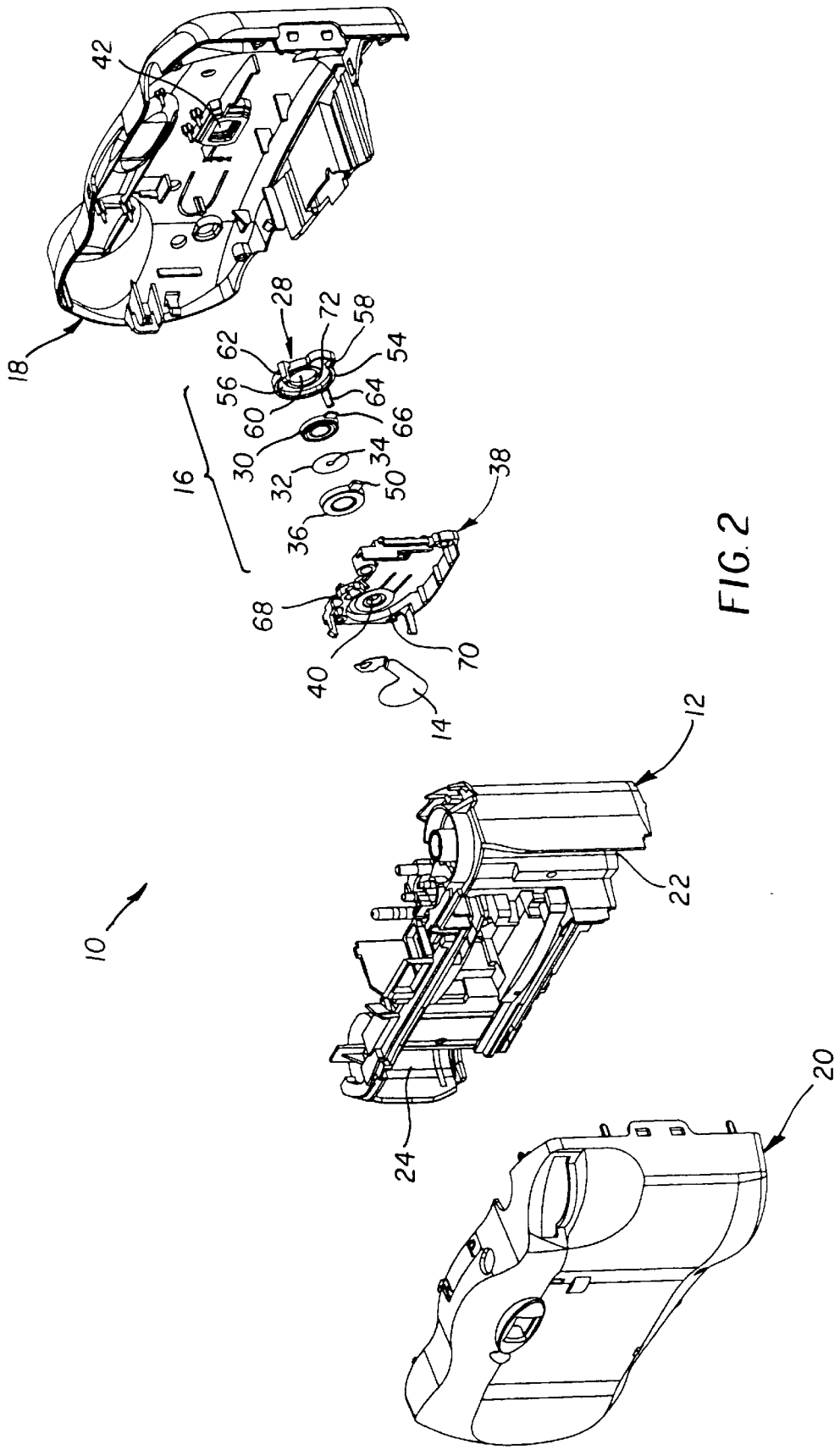
FIG. 2 is a an exploded rear perspective view of the one-time-use camera.

Referring now to the drawings, FIGS. 1 and 2 show a one-time-use camera 10 comprising an opaque plastic main body part 12, a metal shutter blade 14 supported on the main body part for opening and closing movement to take a picture, a plastic lens assembly 16 for forming a focused image of the subject being photographed, and a pair of opaque plastic front and rear cover parts 18 and that house the main body part and the lens assembly.

The main body part 12, as is typical, has an exposed film cartridge chamber 22, an unexposed film roll chamber 24, and a light-admitting hole 26 located between the two chambers and beneath the shutter blade 14. See FIGS. 1 and 2.

Figure 3:
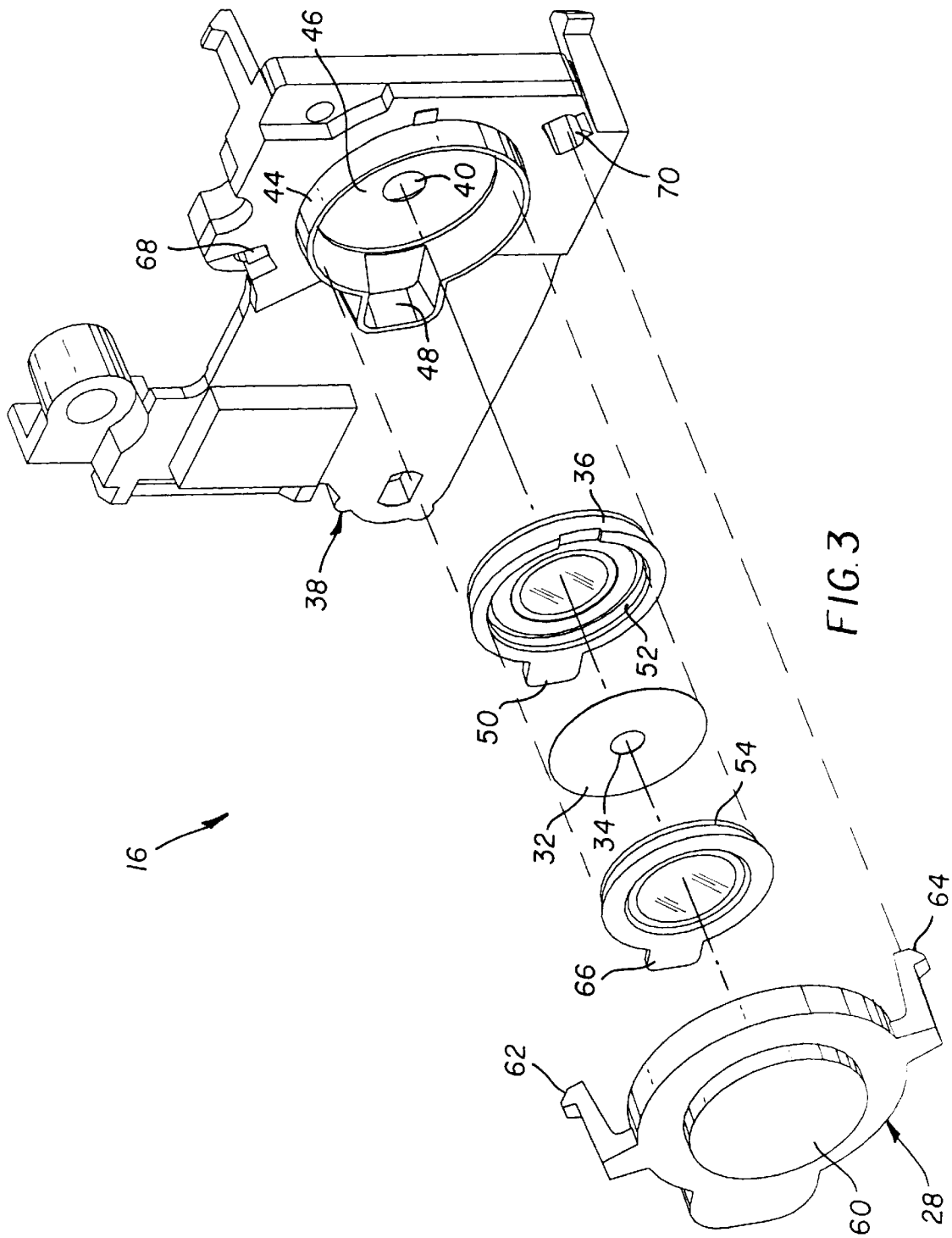
FIG. 3 is an exploded front perspective view of a lens assembly in the one-time-use camera according to the preferred embodiment of the invention.
Figure 4:
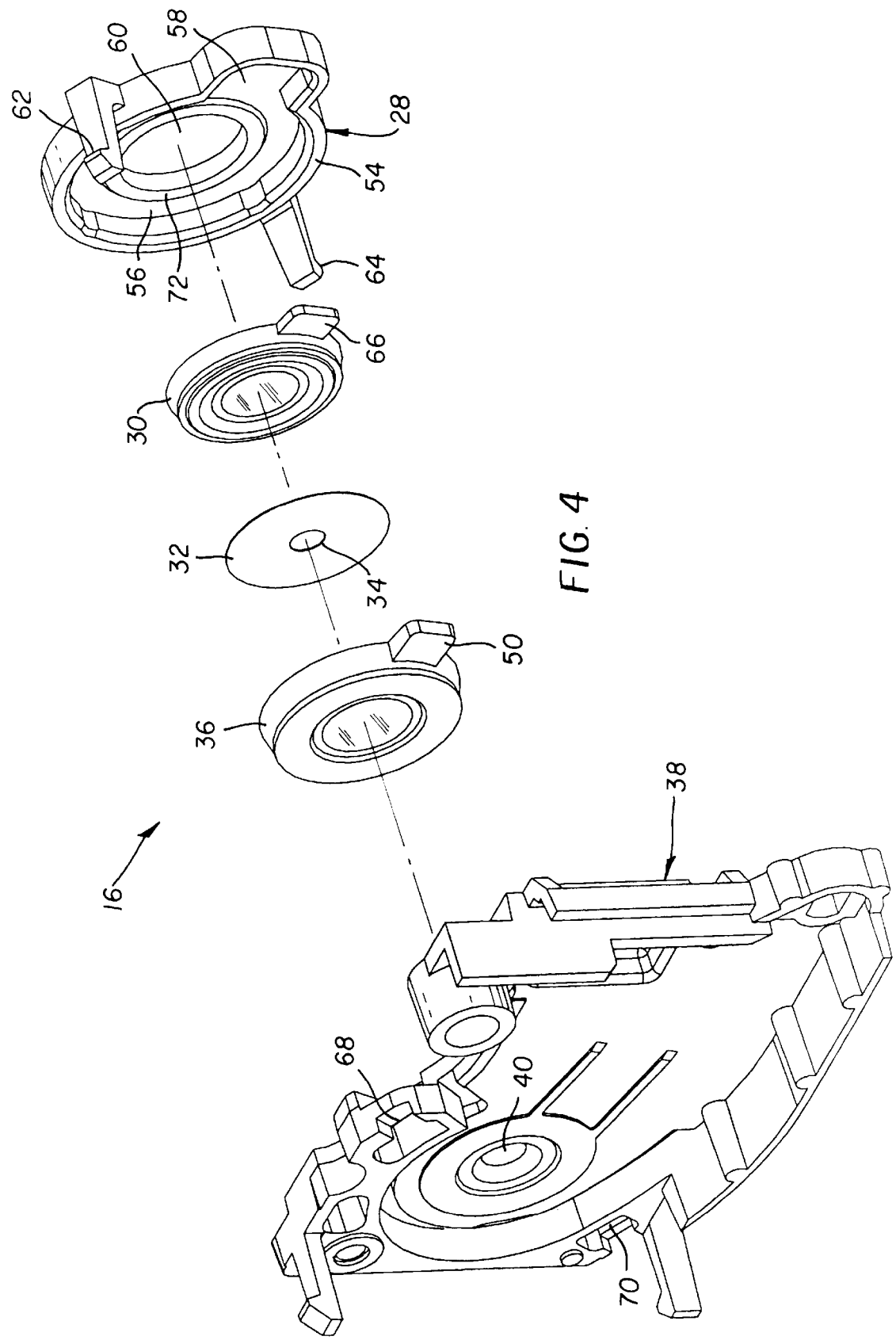
FIG. 4 is an rear front perspective view of the lens assembly.

As shown in FIGS. 3 and 4, the lens assembly 16, comprises a transparent lens retainer-cover 28, a front taking lens element 30, an opaque aperture stop 32 having a center hole 34, a rear taking lens element 36, and an opaque lens support 38 having a baffle hole 40. Preferably, the center hole 34 has an f-number of f/10 and the baffle hole 40 has an f-number of f/8. The center hole 34, the baffle hole 40, and the light-admitting hole 26 in the main body part 12 are optically aligned with a lens opening 42 in the front cover part 18.

The lens support 38 has an integral front rib 44 that is shaped to define a front nest 46 including a peripheral radial extension 48. See FIG. 3. The rear taking lens element 36 is fit completely in the nest 46 and has a peripheral radial protuberance 50 that fits completely in the peripheral radial extension 48 of the nest. The aperture stop 32 is fit completely in a front recess 52 of the rear taking lens element 36. The front taking lens element 30 is fit partially in the recess 52, on top of the aperture stop 32.

The transparent lens retainer-cover 28 has an integral rear rib 54 that is shaped to define a rear cavity 56 including a peripheral radial extension 58, a planar lens covering portion 60, and a pair of retaining hook portions 62 and 64. See FIG. 4. The front taking lens element 30 is fit partially in the cavity 56 and has a peripheral radial protuberance 66 that fits completely in the peripheral radial extension 58 of the cavity. The peripheral radial protuberance 66 of the front taking lens element 30 is similar in size and shape to the peripheral radial protuberance 50 of the rear taking lens element 36 to permit the two protuberances to be aligned with one another as shown in FIGS. 3 and 4. The retaining hook portions 62 and 64 are received in a pair of mating holes 68 and 70 in the lens support 38 to connect the transparent lens retainer-cover 28 to the lens support in order to hold the front and rear taking lens elements 30 and 36 and the aperture stop 32 between the lens retainer-cover and the lens support, but are flexible to permit the hook portions to be individually removed from the mating holes to disconnect the lens retainer-cover and the lens support in order to retrieve the front and rear taking lens elements and the aperture stop. An annular portion 72 of the transparent lens retainer-cover 28, shown in FIG. 4, presses against the front taking lens element 30 when the hook portions 62 and 64 are received in the mating holes 68 and 70.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. shutter blade
16. lens assembly
18. front cover part
20. rear cover part
22. exposed film cartridge chamber
24. unexposed film roll chamber
26. light-admitting hole
28. transparent lens retainer-cover
30. front taking lens element
32. aperture stop
34. center hole
36. rear taking lens element
38. lens support
40. baffle hole
42. lens opening
44. frontrib
46. front nest
48. peripheral radial extension
50. peripheral radial protuberance
52. recess
54. rear rib
56. rear cavity
58. peripheral radial extension
60. planar lens covering portion
62. retaining hook portion
64. retaining hook portion
66. peripheral radial protuberance
68. mating hole
70. mating hole
72. annular portion

What is claimed is:

1. A camera comprising a taking lens, a lens support for supporting said taking lens, and a transparent lens cover for shielding said taking lens, is characterized in that:

said transparent lens cover has a transparent lens covering portion, has a plurality of transparent retaining portions that constitute a single piece with the transparent lens cover and are individually connected to said lens support to hold said taking lens to the lens support, but which can be individually disconnected from said lens support to free said taking lens, and has a transparent annular abutment portion, that presses against said taking lens when said plurality of retaining portions are individually connected to said lens support plate.

* * * * *